United States Patent [19]
Adachi et al.

[11] 3,941,142
[45] Mar. 2, 1976

[54] FLOW-DIVIDER VALVE

[75] Inventors: Yoshiharu Adachi, Toyota; Uichiro Kobashi, Okazaki, both of Japan

[73] Assignee: Aisin Seiki Kabushiki Kaisha, Kariya, Japan

[22] Filed: May 16, 1974

[21] Appl. No.: 470,647

[30] Foreign Application Priority Data
May 21, 1973 Japan.............................. 48-56452

[52] U.S. Cl.................................. 137/101; 60/422
[51] Int. Cl.².......................................... G05D 11/03
[58] Field of Search ............... 60/422; 137/101, 117

[56] References Cited
UNITED STATES PATENTS
2,859,762  11/1958  Banker................................ 137/101
3,680,581   8/1972  Schwerin............................ 138/101

Primary Examiner—Robert G. Nilson
Attorney, Agent, or Firm—Berman, Aisenberg & Platt

[57] ABSTRACT

To independently supply pressurized fluid from a fluid pump to first and second hydraulically powered devices to be operated independently under different conditions, a flow-divider valve comprises a valve body assembled within a casing to form a first pressure chamber in open communication with the fluid pump and a second pressure chamber in open communication with the first hydraulically powered device, the first pressure chamber being selectively connected with the second hydraulically powered device in response to displacements of the valve body to regulate fluid quantity to be supplied into the second device and the communication degree between the second pressure chamber and the first device being regulated in response to the displacements of the valve body. The flow-divider valve further comprises a variable orifice assembled within the casing between the first and second pressure chambers to regulate fluid flow from the pump toward the second pressure chamber, and means for controlling the throttling degree of the orifice in response to pressures independently exerted within the first and second hydraulically powered devices.

4 Claims, 2 Drawing Figures

FLOW-DIVIDER VALVE

BACKGROUND OF THE INVENTION

The present invention relates to a flow-divider valve to independently supply pressurized fluid from a fluid pump to two hydraulically powered devices to be operated independently under different conditions, and more particularly to an improvement of the flow-divider valve to control each of fluid quantities necessary to satisfactorily operate respectively each of two hydraulically powered devices in response to the operations of the devices.

SUMMARY OF THE INVENTION

The main object of the present invention is to provide a flow-divider valve, wherein a pressurized fluid quantity discharged from a fluid pump is supplied in predetermined rates to two hydraulically powered devices while they are under their inoperative conditions, one device is fully supplied with the fluid quantity under its operative condition and the other device maintains its unloaded condition yet is supplied with preliminary fluid quantity enough to be swiftly conditioned to its operation, and enough fluid quantities are supplied to the both devices respectively to fully operate both of them.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
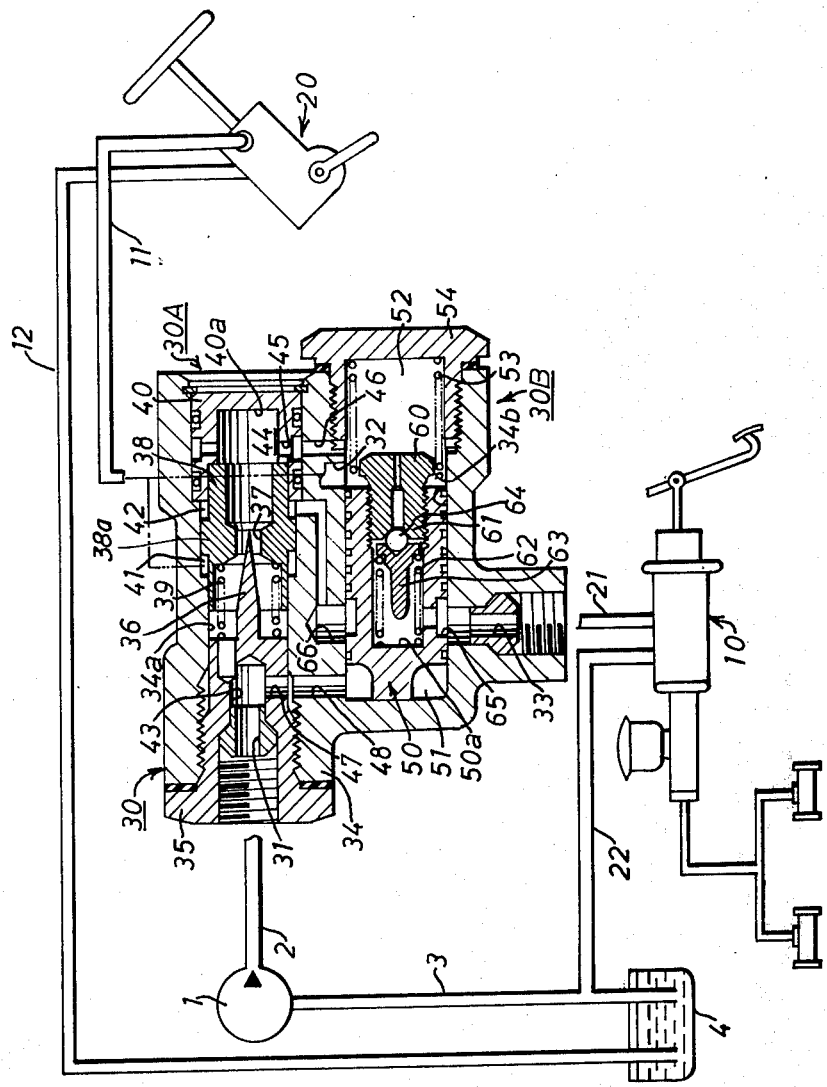
FIG. 1 is an elevational cross-section view of a first preferred embodiment of a flow-divider valve in accordance with the present invention.

Now referring to FIG. 1 of the accompanying drawings, a first preferred embodiment of the present invention is disclosed, wherein a flow-divider valve 30 in accordance with the present invention is disposed within hydraulic circuits for a brake booster 10 and a power steering device 20 of a wheeled vehicle. An inlet port 31 of the flow-divider valve 30 is connected to a conduit 2 which extends to a fluid pump 1 driven by the prime engine or electrical motor (not shown) of the vehicle. First and second outlet ports 32 and 33 of the flow-divider valve 30 are connected respectively to a first hydraulic open circuit for the power steering device 20 and a second hydraulic open circuit for the brake booster 10 respectively by way of conduits 11 and 21.

The flow-divider valve 30 comprises a casing 34 having therein a variable orifice assembly 30A and a variable valve assembly 30B. The variable orifice assembly 30A is substantially provided with a needle valve 36, a retainer 38, a spring 39 and a plug 40. The needle valve 36 is axially integral with an projecting inwardly from a plug 35 which is hermetically threaded on the interior of the casing 34. The retainer 38 is of a cylindrical shape and provided therein at its axial center with an orifice 37. This retainer 38 is snugly and axially slidably engaged within a first cylindrical bore 34a of the casing 34, and has a central enlarged shoulder or land 38a which slides in a slightly larger bore of casing 34 thereby to form a pair of annular chambers 41 and 42 at the both sides of the shoulder between the casing and the circumference of the retainer. The spring 39 is disposed between the inside faces of the plug 35 and the retainer 38 to normally bias the retainer 38 outward or rightward in the figure. The plug 40 is positioned at the right end portion of the first cylindrical bore 34a to slidably receive the right end portion of the retainer 38 therein. Provided at the ends of the retainer 38 are a communication chamber or passage 43 within the plug 35 and a chamber 44 between the retainer 38 and the interior space 40a of the plug 40. And the pressure difference between these two chambers 43 and 44 is generally predetermined to be approximately 2kg/cm$^2$.

Within the orifice assembly 30A is formed a variable annular orifice by the opening 37 and the needle valve 36. Pressurized operation fluid from the fluid pump 1 is delivered into a right chamber 52 provided within the variable valve assembly 30B by way of the inlet port 31 of the plug 35, the communication chamber 43, the central portion of the first cylindrical bore 34a of the casing 34, the annular orifice formed by the needle valve 36 and the orifice 37, the chamber 44, a communication hole 45 drilled through the plug 40, and a communication hole 46 drilled through a partition wall of the casing 34. The variable annular orifice formed with the needle valve 36 and the orifice 37 functions to maintain constantly the said pressure difference of 2kg/cm$^2$.

The variable valve assembly 30B is provided with a valve body 50 which is snugly and axially slidably engaged within a second cylindrical bore 34b to form a left chamber 51 between one end of the casing and the adjacent end of the valve body, and the right chamber 52 between the plug 54 at the opposite end of the casing and the other end of the valve body. This valve body 50 is normally biased leftward in the figure by a spring 53 which is disposed between the right end face of the valve body 50 and the interior wall of a plug 54 hermetically threaded in the second cylindrical bore 34b. The left chamber 51 is communicated with the inlet port 31 by way of a communication hole 48 drilled through the partition wall of the casing 34 and a communication hoe 47 drilled through the plug 35 of the variable orifice assembly 30A. The right chamber 52 communicates with the first outlet port 32 which is drilled through the partition wall of the casing 34.

The valve body 50 includes within its interior bore 50a a relief valve comprising a plug 60 of which a valve portion 61 is threaded on the interior wall of the valve body 50, and a ball 64 seated on the valve portion 61 by a spring 62 through a holder 63.

In the variable valve assembly 30B, the operation fluid regulated by the variable annular orifice of the variable orifice assembly 30A and delivered into the right chamber 52 is lead to the first hydraulic open circuit through a first variable throttle formed by the right end outer circumference of the valve body 50 and the first outlet port 32. At the same time, pressurized operation fluid not regulated by the variable orifice is supplied into the left chamber 51 directly from the fluid pump 1 through the inlet port 31 and the communication holes 47 and 48. When the pressure difference between the chambers 51 and 52 exceeds the biasing force of the spring 53, the valve body 50 makes its rightward displacement to communicate the left chamber 51 with the second outlet port 33. The valve body 50 is designed to regulate its displacement so that the pressure difference between the communication chamber 43 and the chamber 44 is constantly maintained at the above-mentioned predetermined value.

The conduit 11 of the first hydraulic open circuit is in communication with the left annular chamber 41 formed around the left outer circumference of the retainer 38. The conduit 21 of the second hydraulic open circuit is communicated with the right annular chamber 42 formed around the right outer circumference of the retainer 38 by way of the second outlet port 33, an annular groove 65 provided on the outer circumference of the valve body 50 and a communication passage 66 provided through the partition wall of the casing 34. Thus, within the variable orifice assembly 30A, the retainer 38 is displaced in response to load pressures in the first and second hydraulic circuits, thereby to control the size of the annular orifice formed by the needle valve 36 and the orifice 37.

Described in detail hereinafter is the operation of the flow-divider valve 30 having the above-disclosed construction. While both of the brake booster device 10 and the power steering device 20 are conditioned to their inoperative states, due to the nature of the first and second hydraulic open circuits, the pressurized operation fluid from the fluid pump 1 is delivered into the flow-divider valve 30 through the inlet port 31. More specifically, the operation fluid is supplied into the right chamber 52 of the variable valve assembly 30B by way of the communication passage 43, the first cylindrical bore 34a of the casing 34, the annular orifice formed by the needle valve 36 and the orifice 37, the chamber 44 and the communication holes 45 and 46 in sequence. Simultaneously, the operation fluid takes a bifurcated path and flows into the left chamber 51 directly from the inlet port 31 by way of the communication holes 47 and 48. This causes a pressure difference between the left and right chambers 51 and 52 proportionally to the quantity of the operation fluid which passes through the annular orifice.

Now when this pressure difference exceeds the biasing force of the spring 53, the valve body 50 displaces rightward in the figure to open the second variable throttle formed by the second outlet port 33 and the left end outer circumference of the valve body 50, thereby to complete communication between the left chamber 51 and the second outlet port 33. Under the mentioned state, the operation fluid within the right chamber 52 is supplied into the first hydraulic open circuit for the power steering device 20 through the first variable throttle at the first outlet port 32 regulated in response to the displacements of the valve body 50. At the same time, the operation fluid within the left chamber 51 is supplied into the second hydraulic open circuit for the brake booster device 10 by way of the second variable throttle at the second outlet port 33. In this instance, the annular chambers 41 and 42 around the outer circumference of the retainer 38 of the variable orifice assembly 30A are supplied with the operation fluid being supplied into the first and second hydraulic open circuits respectively, through first outlet port 32 and connected duct shown in broken lines, and second outlet port 33 and passages 65, 66. The retainer 38, however, stays at its original position by the biasing force of the spring 39.

Under the mentioned state, pressure produced within the conduit 21 by operation of the brake booster device 10 increases the pressure within the annular chamber 42 over the value of the pressure within the annular chamber 41. This displaces the retainer 38 leftward until the pressure difference between the chambers 41 and 42 is equalized with the biasing force of the spring 39, thereby to reduce the capacity of the variable annular orifice formed by the needle valve 36 and the orifice 37. Simultaneously, the pressure produced in the conduit 21 acts into the left chamber 51 in the variable valve assembly 30B. This causes a temporary rightward displacement of the valve body 50 against the biasing force of the spring 53 to temporarily reduce the opening of the first variable throttle at the first outlet port 32. Then, the pressure difference between the left and right chambers 51 and 52 becomes smaller in response to the reduction of the opening of the first variable throttle, thereby to cause a slight leftward displacement of the valve body 50 to such a position where the reduced pressure difference is equalized with the biasing force of the spring 53. In other words, the fluid quantity passing through the first variable throttle is compensated by the fluid quantity passing through the variable orifice and a fluid quantity responsive to the displacement of the valve body 50 is supplied into the second hydraulic open circuit for the brake booster device 10.

When the power steering device 20 is operated under the operative condition of the brake booster device 10, which means an increase of the operation fluid pressure for the power steering device 20, within the pressure value of the operation fluid for the brake booster device 20 while the brake booster pressure value is increasing from a certain value, for example 10kg/cm$^2$, the pressure within the annular chamber 41 increases due to pressure produced in the conduit 11. Thus the pressure difference between the annular chambers 41 and 42 is reduced to displace the retainer 38 rightward by the biasing force of the spring 39. Consequently, the opening of the variable annular orifice is increased in response to the displacement of the retainer 38. At the same time, within the variable valve assembly 30B, the pressure produced within the conduit 11 increases the pressure within the right chamber 52 to reduce the pressure difference between the left and right chambers 51 and 52, thereby to cause a leftward displacement of the valve body 50 by the biasing force of the spring 53. In this instance, the leftward displacement of the valve body 50 is regulated to maintain the pressure difference between the fuid flows before and after passing through the variable annular orifice within the predetermined value of approximately 2kg/cm$^2$ and accordingly, the fluid quantity passing through the first outlet port 32 increases.

In the case that the power steering device 20 only is operated, the pressure produced within the conduit 11 maintains the pressure within the annular chamber 41 constantly larger than that within the annular chamber 42. Thus, the retainer 38 stays constantly at its original position by the biasing force of the spring 39 to cause the maximum opening of the variable annular orifice. At the same time within the variable valve assembly 30B, the pressure produced within the conduit 11 increases the fluid pressure within the right chamber 52 to reduce the pressure difference between the left and right chambers 51 and 52, thereby to displace the valve body 50 leftward by the biasing force of the spring 53. In this instance, the leftward displacement of the valve body 50 is regulated so that the pressure difference between the fluid flows before and after passing through the variable annular orifice may be maintained within the predetermined value of approximately 2kg/cm². Accordingly, the fluid quantity passing through the first outlet port 32 is increased.

Consequently, the maximum fluid quantity is supplied into the first hydraulic open circuit through the first outlet port 32. When the pressure within the right chamber 52 exceeds the predetermined value, the ball 64 of the relief valve moves off the valve portion 61 to discharge the pressurized fluid within the right chamber 52 into the second hydraulic open circuit through the bore 50a of the valve body 50 and the second outlet port 33.

Figure 2:
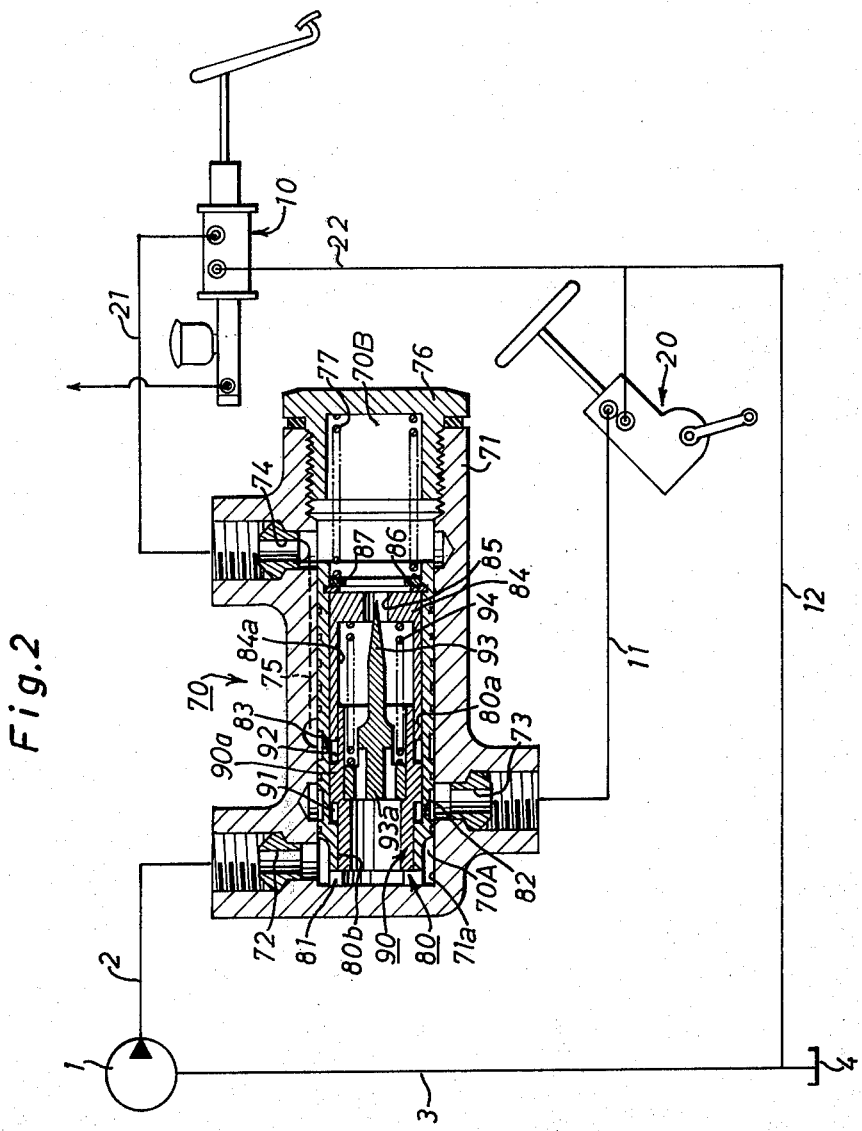
FIG. 2 is an elevational cross-section view of a second preferred embodiment of a flow-divider valve in accordance with the present invention.

A second preferred embodiment of the present invention is described hereinafter in reference with FIG. 2. This second embodiment is featured in that the variable orifice and valve assemblies 30A and 30B of the first embodiment are coaxially assembled. The same reference numerals and characters are used for the same portions and parts and, therefore, no explanation is repeated for the same parts.

The flow-divider valve 70 comprises a casing 71 which is provided thereon with an inlet port 72 and a first and a second outlet ports 73 and 74: the inlet port 72 is connected to the fluid pump 1 through the conduit 2, the first outlet port 73 to the first outlet port 73 to the first hydraulic open circuit for the power steering device 20 through the conduit 11 and the second outlet port 74 to the second hydraulic open circuit for the brake booster device 10 through the conduit 21.

Within a cylindrical bore 71a of the casing 71 engaged snugly and axially slidably is a valve body 80 which may correspond to the valve body 50 of the first preferred embodiment. This valve body 80 is of a cylindrical shape having radially thereon a slit 81 in open communication with the inlet port 72, a communication hole 82 in communication with the first outlet port 73 and a communication hole 83 in communication with the second outlet port 74 through a passage 75. A spring 77 is engaged at its one end with the right end face of the valve body 80 by way of a circular clip 86 and a spacer 87 and at the other end with the inside wall of a plug 76 threaded on the wall of the bore 71a. The valve body 80 is provided therein with a cylindrical bore 80a wherein engaged are a cylindrical member 84 held by the circular clip 86 and a retainer member 90 which may correspond to the retainer 38 of the first preferred embodiment.

The retainer member 90 is slidable within the cylindrical bore 80a, having its left portion in the figure engaged within a small diameter interior bore 80b of the valve body 80 and its right portion engaged within the bore 84a of the cylindrical member 84. Annular chambers 91 and 92 are formed at opposite sides of the central enlarged land 90a on the outer circumference of the retainer member 90, the annular chamber 91 being in communication with the first hydraulic open circuit through the communication hole 82 and the annular chamber 92 being in communication with the second hydraulic open circuit through the communication hole 83. Coupled in the interior of the retainer member 90 by way of a spring 94 is the base portion 93a of a needle valve 93 for controlling the opening of an orifice 85 drilled through the axial center of the cylindrical member 84.

Described in detail hereinafter is the operation of the flow-divider valve 70 exampled in the second preferred embodiment. Pressurized operation fluid from the fluid pump 1 flows into a right chamber 70B of the casing 71 through the conduit 2, the inlet port 72, the slit 81, the interior of the retainer member 90, the interior 84a of the cylindrical member 84, and a variable annular orifice formed between the needle valve 93 and the orifice 85 in sequence. This causes a pressure difference between a left chamber 70A of the casing 71 and the right chamber 70B in proportion to the fluid quantity passing through the variable annular orifice. When the pressure difference overcomes the biasing force of the spring 77, the valve body 80 displaces rightward in the figure to open a first variable throttle formed by the first outlet port 73 and the left end of the outer circumference of the valve body 80, thereby to complete communication between the left chamber 70A and the first outlet port 73. Under the mentioned state, the operation fluid supplied into the right chamber 70B flows into the second hydraulic open circuit for the brake booster device 10 by way of a second variable throttle formed by the right end of the second outlet port 74 and the valve body 80, the opening of the second variable throttle being regulated in response to the displacement of the valve body 80. At the same time, a portion of the operation fluid supplied into the left chamber 70A is delivered into the first hydraulic open circuit for the power steering device 20 by way of the first variable throttle at the first outlet port 73. In this instance, although the operation fluid supplied into the first and second open circuits are respectively lead into the annular chambers 91 and 92 provided on the outer circumference of the retainer member 90, the spring 94 holds the retainer member 90 at its left end position in the figure.

When the power steering device 20 is operated under the mentioned state, the pressure produced within the conduit 11 increases the pressure within the annular chamber 91 over that within the annular chamber 92. This displaces the retainer member 90 rightward until the exceeding pressure is equalized by the biasing force of the spring 94, thereby to reduce the capacity of the variable annular orifice formed between the needle valve 93 and the orifice 84 in response with the displacement of the retainer member 90. Simultaneously, the pressure produced within the conduit 11 increases the pressure within the left chamber 70A to move the valve body 80 rightward against the resilient force of the spring 77, thereby to temporarily throttle the opening of the second outlet port 74. This causes a reduction of the pressure difference between the left and right chambers 70A and 70B in response to the movement of the valve body 80, thereby to displace the valve body 80 slightly leftward toward a position where the reduced pressure difference is equalized by the biasing force of the spring 77. In other words, the quantity of the operation fluid passing through the second variable throttle is compensated by the quantity of the fluid passing through the variable annular orifice. And supplied into the first hydraulic open circuit for the power steering device 20 is the operation fluid in a quantity responsive to the displacement of the valve body 80.

In the case that the brake booster device 10 is operated during the operation of the power steering device 20, or that the brake booster device 10 only is operated, a very similar or almost the same operation occurs within the flow-divider valve 70.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A flow-divider valve comprising:
   a casing provided with an inlet port connected to a fluid pressure source, a first outlet port connected to a first hydraulic open circuit for a first hydraulically powered device and a second outlet port connected to a second hydraulic open circuit for a second hydraulically powered device;
   a first pressure chamber in open communication with said inlet port and a second pressure chamber in open communication with said first outlet port, a valve body displaceably disposed between said first and second pressure chambers, said first pressure chamber being selectively connected with said second outlet port in response to displacements of said valve body to regulate fluid quantity to be supplied into said second hydraulic open circuit and the communication degree between said second pressure chamber and said first outlet port being regulated in response to the displacements of said valve body to control fluid quantity to be supplied into said first hydraulic open circuit;
   variable orifice means in said casing between said first and second pressure chambers to regulate fluid flow from said inlet port toward said second pressure chamber; and
   means for controlling the throttling degree of said orifice means in response to pressure independently exerted within said first and second hydraulic open circuits;
   whereby the displacements of said valve body are compensated in accordance with the throttling degree of said variable orifice means, said means for controlling the throttling degree of said orifice means including third and fourth pressure chambers which are independently in open communication with the first and second open hydraulic circuits respectively.

2. A flow-divider valve as set forth in claim 1, wherein said casing includes a first cylindrical bore having said inlet port thereon and a second cylindrical bore having said first and second outlet ports communicating therewith, said valve body being disposed within said second bore between said first and second pressure chambers and being biased to normally close said second outlet port, and said variable orifice means being disposed in said first bore and comprising a stationary needle element provided within said first bore and a cylindrical retainer slidable within said first bore coaxially with said needle element, said retainer having an orifice at its axial center for completing said variable orifice means associated with said needle element, said retainer having an enlarged land separating said third and fourth pressure chambers which are formed as annular chambers between its outer circumference and the inner wall of said first bore to complete said means for controlling the throttling degree of said orifice means, said first and second pressure chambers being in communication with said inlet port directly and through said variable orifice means respectively.

3. A flow-divider valve as set forth in claim 2, wherein said valve body is provided therein with a relief valve for compensating the pressure exerted within said second pressure chamber.

4. A flow-divider valve as set forth in claim 1, wherein said casing includes a cylindrical bore therein having said inlet and first and second outlet ports thereon, said valve body is cylindrical and slidably engaged within said bore between said first and second pressure chambers formed at opposite ends of said bore, said valve body being biased to normally close said second outlet port, and said variable orifice means comprises a cylindrical element provided with an orifice at its axial center and stationarily disposed within said valve body, a cylindrical retainer slidable within said valve body and forming said third and fourth pressure chambers as a pair of annular chambers between its outer circumference and the inner wall of said valve body, and a needle element slidably assembled within said retainer to complete said variable orifice means associated with said orifice, said first and second pressure chambers being in communication with said inlet port directly and through said variable orifice means respectively.

* * * * *